(12) United States Patent
Inagawa et al.

(10) Patent No.: US 6,324,049 B1
(45) Date of Patent: *Nov. 27, 2001

(54) ELECTRIC DOUBLE LAYER CAPACITOR

(75) Inventors: Masako Inagawa; Keitaro Katsu; Yoshiki Inoue, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,355

(22) Filed: Dec. 8, 1997

(30) Foreign Application Priority Data

Dec. 19, 1996 (JP) ................................... 8-328424

(51) Int. Cl.[7] ............................ H01G 9/00; H01G 9/155
(52) U.S. Cl. ......................... 361/502; 361/502; 361/503
(58) Field of Search .................................. 361/500, 502, 361/503, 504, 508, 516, 517, 522, 523, 525, 526, 528, 532, 535, 534, 541

(56) References Cited

U.S. PATENT DOCUMENTS

| | | | |
|---|---|---|---|
| 3,652,902 | * | 3/1972 | Hart et al. ............................. 361/502 |
| 4,488,203 | * | 12/1984 | Muranaka et al. .................... 361/302 |
| 4,542,444 | * | 9/1985 | Boland ................................. 361/502 |
| 4,683,516 | * | 7/1987 | Miller ................................... 361/502 |
| 4,783,723 | * | 11/1988 | Watanabe et al. .................... 361/502 |
| 5,136,472 | * | 8/1992 | Tsuchiya et al. ..................... 361/502 |
| 5,136,473 | * | 8/1992 | Tsuchiya et al. ..................... 361/502 |
| 5,303,118 | * | 4/1994 | Saito et al. ........................... 361/502 |
| 5,369,546 | * | 11/1994 | Saito et al. ........................... 361/502 |
| 5,621,607 | * | 4/1997 | Farahmandi et al. ................ 361/502 |

FOREIGN PATENT DOCUMENTS

| | | |
|---|---|---|
| 60-151126 | 10/1985 | (JP) . |
| 61-48916 | 3/1986 | (JP) . |
| 61-110416 | 5/1986 | (JP) . |
| 63-299305 | 12/1988 | (JP) . |
| 64-9609 | 1/1989 | (JP) . |
| 2-305427 | 12/1990 | (JP) . |
| 3-124013 | 5/1991 | (JP) . |
| 4-288361 | 10/1992 | (JP) . |
| 5-251271 | 9/1993 | (JP) . |
| 6-20875 | 1/1994 | (JP) . |
| 7-240348 | 9/1995 | (JP) . |
| 3-280516 | * 12/1991 | (JP) ................................. H01G/9/00 |

OTHER PUBLICATIONS

Office Action issued May 15, 2001 in a corresponding Japanese application and partial translation.

* cited by examiner

*Primary Examiner*—Dean A. Reichard
*Assistant Examiner*—Eric W. Thomas
(74) *Attorney, Agent, or Firm*—Sughrue, Mion, Zinn, Macpeak & Seas, PLLC

(57) ABSTRACT

An electric double layer capacitor is formed by stacking one or a plurality of basic cells each having a pair of polarized electrodes, collectors, and a gasket unit. The polarized electrodes oppose each other via a separator made from a porous material soaked in a water-based electrolytic solution such as sulfuric acid. The collectors contact surfaces of the polarized electrodes away from surfaces in contact with the separator. The gasket unit is so arranged as to surround peripheral end faces of the polarized electrodes with a predetermined spacing therebetween. In this electric double layer capacitor, a peripheral portion of the separator projecting from the polarized electrode end faces is surrounded by another material.

12 Claims, 8 Drawing Sheets

ELECTRIC DOUBLE LAYER CAPACITOR

BACKGROUND OF THE INVENTION

1. Field of the Invention

The present invention relates to an electric double layer capacitor and, more particularly, to a large-capacitance electric double layer capacitor using solid-state polarized electrodes as electrodes.

2. Description of the Prior Art

The first prior art of an electric double layer capacitor will be described below with reference to FIGS. 1 to 3.

FIG. 1 is a perspective view showing the structure of the conventional electric double layer capacitor. FIG. 2 is a cross-sectional view of a basic cell of the conventional electric double layer capacitor. FIG. 3 is a sectional view taken along a line III—III in FIG. 1.

Referring to FIG. 2, a pair of polarized electrodes 3 are made from solid-state activated carbon such as activated carbon/polyacene-based material described in Japanese Unexamined Patent Publication No. 4-288361. A pair of collectors 4 on the two sides are made from conductive carbon-containing rubber or plastic and contact-bonded to the polarized electrodes 3. The polarized electrodes 3 oppose each other via a separator 1 made from a porous material. The polarized electrodes 3, a gasket assembly 5 having a frame-like structure in which a vent valve 8 is formed as shown in FIG. 3, and the collectors 4 together form a basic cell 7 (FIG. 1) in which an electrolytic solution 6 is sealed.

Since the breakdown voltage of this electric double layer capacitor is restricted by the electrolytic voltage of the electrolytic solution 6, a plurality of basic cells 7 are connected in accordance with a required breakdown voltage. Additionally, to decrease the connection resistance between adjacent basic cells 7 and between the basic cell 7 and a terminal electrode 13 (FIG. 1), the electric double layer capacitor is pressurized by a predetermined pressure in the stacking direction by a pair of pressurizing plates 12 as shown in FIG. 1.

Recently, new applications of such an electric double layer capacitor have been found and studied because the use of the polarized electrodes 3 has increased the capacitance and decreased the ESR (Equivalent Series Resistance). For example, an electric double layer capacitor is used in combination with a lead-acid battery to form a starter motor driving power supply of an automobile or used in combination with a solar cell to form an auxiliary power supply. In either application, it is highly possible that an electric double layer capacitor is installed in a high-temperature environment. Therefore, it is essential to guarantee the reliability in such an environment.

Unfortunately, if the conventional electric double layer capacitor as shown in FIG. 1 is placed in a high-temperature environment for a long time period, the solvent in the electrolytic solution 6 held inside the capacitor reduces by evaporation. Consequently, the capacitance decreases or the ESR increases, and this lowers the reliability.

As one method of solving this problem, an electric double layer capacitor as shown in FIG. 4 is disclosed in Japanese Unexamined Patent Publication No. 6-20875. In the electric double layer capacitor described in this publication, an air gap formed between a gasket assembly 5 and polarized electrodes 3 is filled with a gel electrolytic solution 14 or an electrolytic solution holding member such as quartz wool or a water-absorbing polymer containing an electrolytic solution equivalent to the electrolytic solution 14. This electrolytic solution holding member compensates for a decrease of an electrolytic solution 6 by evaporation in the electric double layer capacitor. This is the second prior art.

The first problem in the above two prior arts is that the effect of preventing the evaporation of the electrolytic solution 6 is unsatisfactory and makes the reliability difficult to improve.

The reason for this is as follows. The electric double layer capacitor described in Japanese Unexamined Patent Publication No. 4-288361 has a closed structure in which the vent valve 8 is filled and sealed with a resin. To prevent the evaporation of the electrolytic solution 6, it is necessary to improve the sealing properties. In this structure, however, a gas is produced by a redox reaction upon application of a voltage and the internal pressure is raised by a temperature rise. Consequently, a cell stacked body 11 expands and breaks within short time periods.

To solve this problem, it is possible to form a structure in which the vent valve 8 is allowed to communicate with the outside without being filled with an adhesive. If this is the case, however, the following problems are posed by the individual fillers, so the reliability is still difficult to improve.

First, if the filler is the gel electrolytic solution 14 as in the first and second prior arts, after the cell stacked body 11 is assembled, the gel electrolytic solution 14 is injected from the vent valve 8 into the air gap between the polarized electrodes 3 and the gasket assembly 5, thereby forming an electric double layer capacitor. The viscosity of the gel electrolytic solution 14 is initially high and increases with time. Accordingly, it is difficult to uniformly fill the whole small narrow air gap with the gel electrolytic solution 14. Consequently, the electrolytic solution 6 evaporates from a portion left behind as an air gap without being filled, and the reliability lowers.

Second, consider a case in which the filler is quartz wool or a water-absorbing polymer. A formation method in this case is to assemble the cell stacked body 11, fill the air gaps with quartz wool or a water-absorbing polymer, and inject the gel electrolytic solution 14 or the electrolytic solution 6.

It is difficult to inject the gel electrolytic solution 14 for the same reason as in the first case. If the electrolytic solution 6 is, e.g., sulfuric acid, this electrolytic solution 6 can be injected with no problem. However, since this easy injection increases the moisture release, no remarkable effect on dry-up can be obtained. Although the reliability is slightly improved because the electrolytic solution holding member is formed around the electrolytic solution 6, this effect is not so typical.

The second problem is the difficulty of improving the productivity in forming electric double layer capacitors by the prior arts.

The reason for this is as follows. In the electric double layer capacitor described in Japanese Unexamined Patent Publication No. 6-20875, after the capacitor is assembled the entire portion around the polarized electrodes 3 is uniformly filled with the electrolytic solution 6. Accordingly, it is necessary to accurately arrange both of the polarized electrodes 3 in the central portion of the gasket assembly 5. Additionally, as already described above, uniformly filling the air gap with the gel electrolytic solution 14 is difficult and time-consuming. Also, one additional step is required to form the electrolytic solution holding member such as a water-absorbing polymer or quartz wool.

The third problem is that electric double layer capacitors are difficult to miniaturize by the prior arts.

The reason for this is as follows. In the electric double layer capacitor described in Japanese Unexamined Patent Publication No. 6-20875, an air gap with a certain predetermined size or lager must be formed between the polarized electrodes 3 and the gasket assembly 5. This is necessary even if the size of the cell stacked body 11 is decreased, and downsizing is also difficult in the direction of thickness. This makes the electric double layer capacitor difficult to miniaturize.

SUMMARY OF THE INVENTION

The present invention has been made to solve the above problems of the prior arts, and has as its object to provide an electric double layer capacitor which has high reliability and can be efficiently miniaturized and manufactured at high productivity.

An electrical double layer capacitor of the present invention provided to achieve the above object has the following respects.

1. In an electric double layer capacitor formed by stacking one or a plurality of basic cells each comprising a pair of polarized electrodes opposing each other via a separator made from a porous material soaked in a water-based electrolytic solution such as sulfuric acid, collectors contacting surfaces of the polarized electrodes away from surfaces in contact with the separator, and gasket means so arranged as to surround peripheral end faces of the polarized electrodes with a predetermined spacing therebetween, a peripheral portion of the separator projecting from the polarized electrode end faces is surrounded by another material.

2. In the above first aspect, the peripheral portion of the separator is surrounded by a thermoplastic resin.

3. In the above first aspect, the peripheral portion of the separator is surrounded by a gel electrolytic solution prepared by mixing a sol solution containing one of silica, alumina, and a mixture thereof, and the electrolytic solution.

4. In the above first aspect, the peripheral portion of the separator is surrounded by a hot-melt material.

5. In the above first aspect, the gasket means is a frame-like gasket assembly including a pair of gaskets respectively corresponding to the polarized electrodes.

6. In the above fifth aspect, each of the gaskets has an L or inverted L cross-sectional shape, and thereby the gasket assembly forms a projecting portion in a substantially central portion of an inner peripheral surface.

7. In the above sixth aspect, the projecting portion of the gasket assembly has a recessed portion opening inward in a substantially central portion of the inner peripheral surface, and the peripheral portion of the separator is fitted in the recessed portion and adhered or heat-sealed to the recessed portion, thereby integrating the gaskets and the separator.

8. In the above first aspect, projecting portions are formed on peripheral end portions of inner surfaces of the polarized electrodes, and notched portions fitting on the projecting portions of the polarized electrodes are formed in peripheral end portions of two side surfaces of the separator.

9. In the above eighth aspect, a width of a surface of the projecting portion of the polarized electrode in contact with the notched portion of the separator is 0.5 mm or more.

10. In the above first aspect, rectangular cut portions having a predetermined width and a predetermined depth are formed in side surfaces of two peripheral end portions of the separator, and frame-like rubber packings having a rectangular or circular cross section are arranged on the cut portions.

11. In the above first aspect, the electrolytic solution contains higher fatty acid such as stearic acid or higher alcohol such as stearyl alcohol in an amount of 0.05% or more of a total amount of the electrolytic solution.

12. In the above fifth aspect, silver iodide is buried in an inner peripheral portion of the gasket assembly so as to expose an inner peripheral surface.

The present invention having the above aspects prevents a dry-up phenomenon, occurring when an electric double layer capacitor is placed in a high-temperature environment, in which an electrolytic solution penetrating into a separator evaporates from the peripheral portion of the separator and the gasified electrolytic solution leaks through a vent valve and closely adhered portions between gaskets and collectors, as follows.

(1) Since the air gap formed on the peripheral portion of the separator is buried with another member, the evaporation of the electrolytic solution from the peripheral portion of the separator is suppressed.

(2) A thin monomolecular film is formed on the electrolytic solution by adding a slight amount of higher fatty acid or higher alcohol to the electrolytic solution. Since this film is made from a material having a small molecular polarized portion, the same state as when the electrolytic solution is covered with a sealed vessel is obtained. Consequently, the evaporation of the electrolytic solution from the vent valve is suppressed.

(3) Since the inner peripheral portion of the gasket assembly is filled with silver iodide, the following effect is obtained. In the case of a rain, for example, the flocculation of a vapor on the surfaces of a solid is a kind of adsorption, and a rail falls when flocculation occurs while a water vapor is saturating or supersaturating in the air. That is, it is only necessary to allow flocculation to easily occur. It is generally said that when the shape of a crystal formed by a gas or a vapor is similar to the shape of the crystal of a solid, the gas or vapor crystals readily flocculate on the surfaces of the solid. By using this phenomenon, an evaporated water vapor is flocculated on the crystal surfaces of silver iodide having the same hexagonal system as the crystal shape of ice. Thus the water vapor is again changed into water and returned to the electrolytic solution. This suppresses the reduction of water in the electrolytic solution.

The first effect of the present invention is to be able to suppress dry-up in a high-temperature environment and improve the reliability. The reason for this is that the peripheral portion of the separator from which the electrolytic solution evaporates is sealed.

The second effect is to be able to manufacture an electric double layer capacitor with high productivity. The reason for this is that an electric double layer capacitor can be manufactured through standard manufacturing steps, without increasing the number of steps, by improving the structures of the gasket, the separator, and the polarized electrode or by adding an additive.

The third effect is to be able to realize a small electric double layer capacitor. The reason for this is that the air gap between the polarized electrode and the gasket can be decreased and the thickness of the polarized electrode can also be decreased.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENTS

Preferred embodiments of the present invention will be described below with reference to the accompanying drawings.

Figure 5:
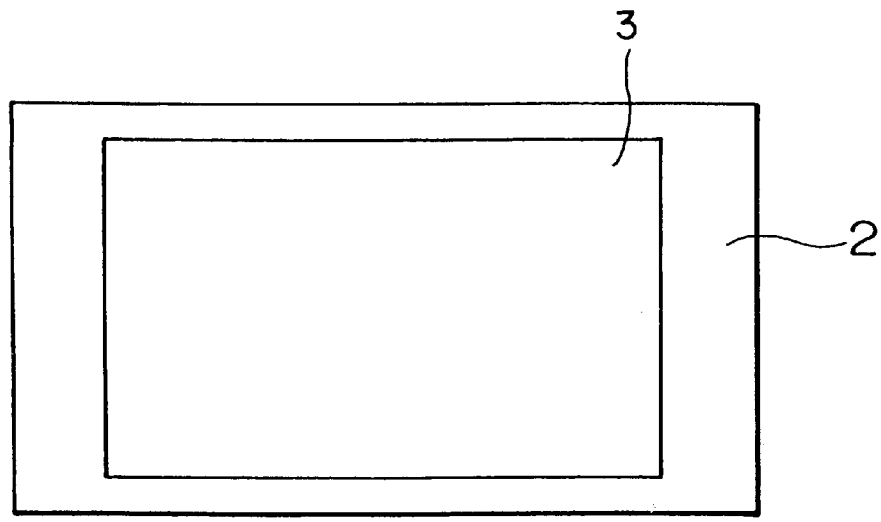
FIG. 5 is a view of a separator used in Example 1 of the present invention.
Figure 6:
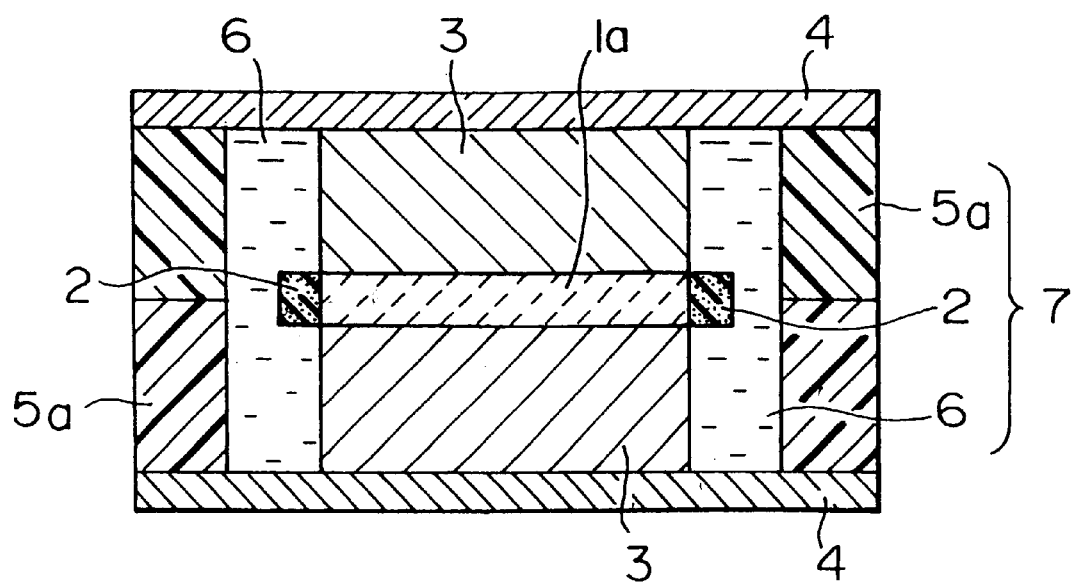
FIG. 6 is a sectional view showing a basic cell structure in Example 1 of the present invention.

FIG. 5 is a plan view showing the structure of a separator $1a$ used in Example 1 of the present invention. FIG. 6 is a cross-sectional view showing a basic cell 7 of an electric double layer capacitor in which a pair of solid-state polarized electrodes 3 placed adjacent to collectors 4 are plane-symmetrically arranged via the separator $1a$ made from a porous material.

EXAMPLE 1

As is apparent from FIG. 5, the separator 1 used in Example 1 is made from an electrically insulating porous material, and its peripheral portion is surrounded by an adhesive. More specifically, a peripheral portion 2 projecting outward from the end faces of the polarized electrodes 3 is surrounded by an epoxy adhesive.

Referring to FIG. 6, a binder material and a manufacturing method of each polarized electrode 3 are not particularly limited, provided that the polarized electrode 3 is made from block-like activated carbon formed by mixing the binder material such as a phenolic resin in powdered activated carbon and sintering the resultant mixture.

A frame-like gasket assembly $5a$ including a pair of gaskets incorporate and seal the polarized electrodes 3, the collectors 4, the separator $1a$, and an electrolytic solution 6. To this end, an insulator such as plastic is used and, in this example, a heat-resistant ABS resin was used.

The collectors 4 were made from a butyl rubber sheet in which a carbon powder and the like were kneaded. The material of the porous-material separator $1a$ is not particularly limited as long as the material is a non-conductive, ion-transmitting film. In this example, a glass fiber separator for a lead-acid battery was used.

In the basic cell 7 of the electric double layer capacitor according to Example 1 of the present invention, the polarized electrodes 3 are so accommodated in the gasket assembly $5a$ as to oppose each other via the separator $1a$. After the electrolytic solution 6 is injected into an air gap formed between the gasket assembly $5a$, the polarized electrodes 3, and the separator $1a$, the basic cell 7 is covered with the collectors 4.

A plurality of basic cells 7 were stacked in series, and the left and right ends of a cell stacked body 11 were electrically connected in parallel via terminal electrodes 13. Finally, pressurizing plates 12 were attached to complete the electric double layer capacitor.

The dimensions of each polarized electrode 3 are 70 mm (L)×50 mm (W)×1 mm (t), the inner dimensions of the gasket assembly $5a$ are 74 mm (L)×54 mm (W)×2.2 mm (t), and the dimensions of the separator 1 are 72 mm (L)×52 mm (W)×0.2 mm (t). The peripheral portion 2 outside the area of the polarized electrode 3 is surrounded by an epoxy adhesive. Eighteen basic cells 7 with this shape were stacked in series to form the cell stacked body 11 having a breakdown voltage of 15 V.

Note that 30-wt % dilute sulfuric acid was used as the electrolytic solution 6, and the polarized electrodes 3 were formed by mixing phenolic powder activated carbon and a powdered phenolic resin at a weight ratio of 70/30 and grinding, granulating, and sintering the resultant mixture.

The following two modifications can be made from Example 1.

Modification 1: The peripheral portion 2 of the separator $1a$ is surrounded by a gel electrolytic solution instead of an adhesive.

Modification 2: The peripheral portion 2 of the separator $1a$ is surrounded by heat-sealing PE (polyethylene) instead of an adhesive.

EXAMPLE 2

Figure 7:
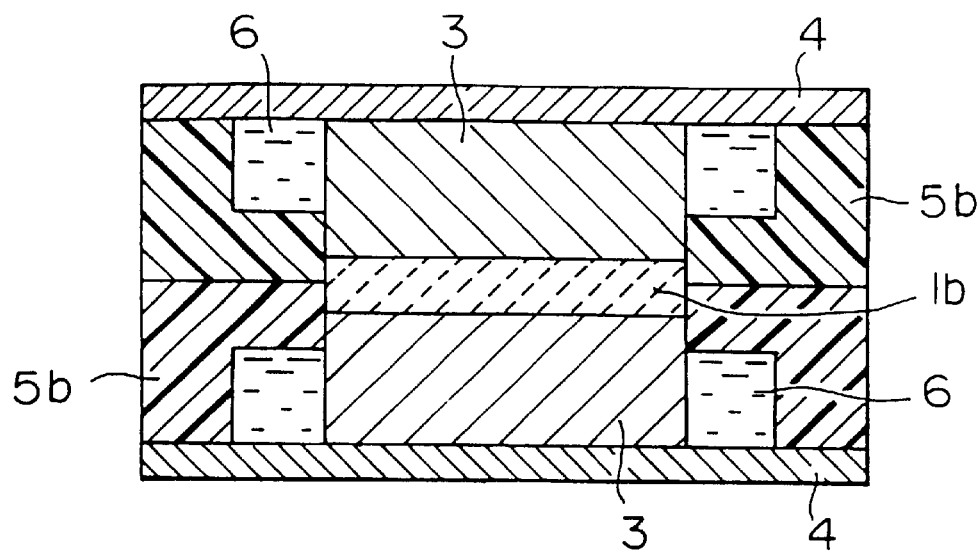
FIG. 7 is a sectional view showing a basic cell structure in Example 2 of the present invention.

FIG. 7 shows the structure of a basic cell 7 used in Example 2 of the present invention.

As shown in FIG. 7, Example 2 uses a pair of gaskets $5b$ having portions projecting inward from their inner peripheral portions to form L and inverted L cross-sectional shapes.

The conditions and method of the manufacture of this electric double layer capacitor are the same as in Example 1.

The dimensions of each polarized electrode 3 are 70 mm (L)×50 mm (W)×1 mm (t), and the inner dimensions of the gasket assembly $5b$ are 74 mm (L)×54 mm (W)×2.2 mm (t). The projecting portion formed on the inner peripheral portion is positioned in a central portion 0.7 mm inside the two end portions in the direction of thickness of the gasket assembly $5b$ and has a rectangular cross section 0.8 mm in height and 2 mm in thickness (width). The dimensions of a separator $1b$ are 70 mm (L)×50 mm (W)×0.2 mm (t), and the peripheral portion of the separator 1 is not surrounded. Note that an electrolytic solution 6 is the same as in Example 1.

As in Example 1, eighteen basic cells 7 with the above shape were stacked in series to form a cell stacked body 11 having a breakdown voltage of 15 V.

Example 2 can be modified as follows.

Figure 8:
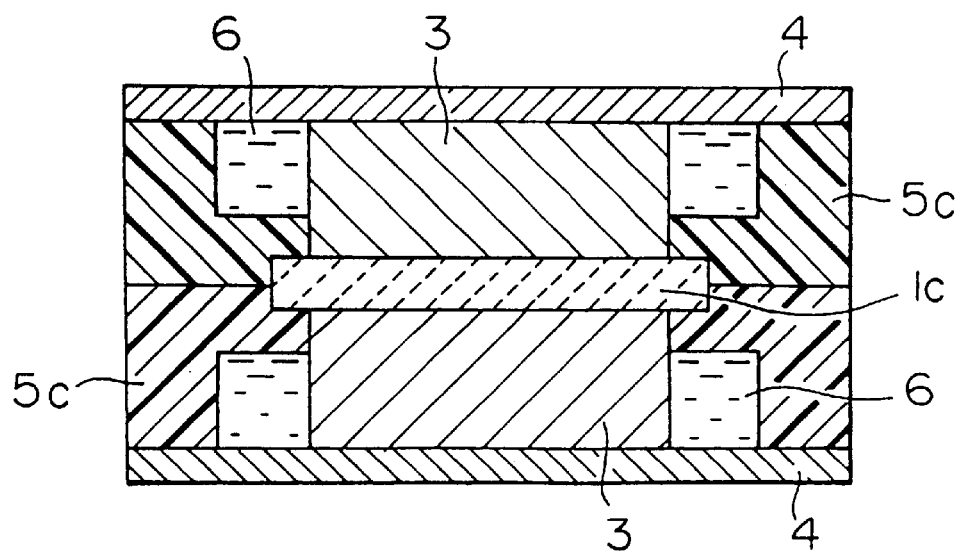
FIG. 8 is a sectional view showing a basic cell structure in a modification of Example 2 of the present invention.

Modification: A recessed portion 0.2 mm wide and 1 mm deep opening inward was formed in the center of the projecting portion of the gasket assembly $5b$ in Example 2. The peripheral portion of the separator $1c$ was fitted in this recessed portion, and the two members were integrated as shown in FIG. 8 by adhering them by using an epoxy adhesive.

EXAMPLE 3

Figure 9:
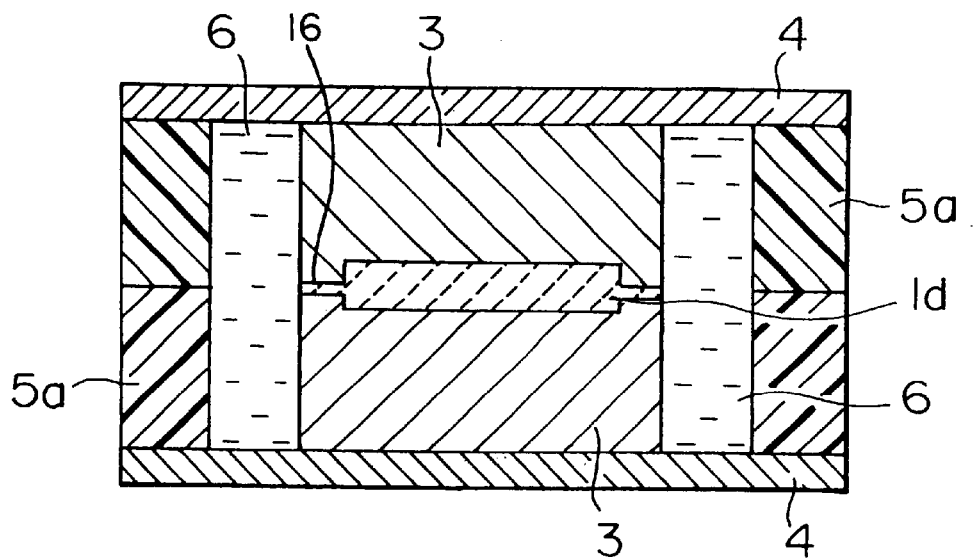
FIG. 9 is a sectional view showing a basic cell structure in Example 3 of the present invention.

FIG. 9 is a cross-sectional view showing the structure of a basic cell 7 used in Example 3 of the present invention.

In this example, as shown in FIG. 9, each polarized electrode 3 has a projecting portion in the peripheral portion of the inner surface. On the other hand, a notched portion 16 fitting in a projecting portion of the polarized electrode 3 is formed in the peripheral portion of each side surface of a separator 1d. Note that the conditions and method of the manufacture of this electrical double layer capacitor are the same as in Examples 1 and 2.

The dimensions of each polarized electrode 3 are 70 mm (L)×50 mm (W)×1 mm (t). Six samples were manufactured by forming projecting portions 0.1 mm in height and 1.0 mm, 0.5 mm, 0.45 mm, 0.4 mm, 0.2 mm, and 0 mm in width on the peripheral portion of the inner surface of the polarized electrode 3. Note that the components of an electrolytic solution 6 and the material and dimensions of a gasket assembly 5a were the same as in Example 1.

EXAMPLE 4

Figure 10:
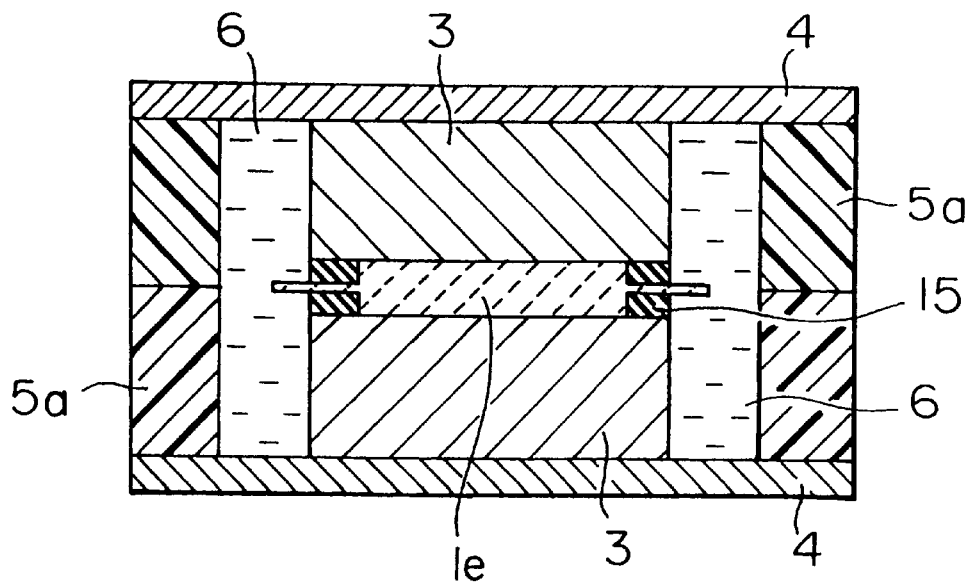
FIG. 10 is a sectional view showing a basic cell structure in Example 4 of the present invention.

FIG. 10 is a cross-sectional view showing the structure of a basic cell 7 of an electric double layer capacitor of Example 4 of the present invention.

The conditions and method of the manufacture of this electric double layer capacitor are the same as in Examples 1 to 3 described above. The dimensions of each polarized electrode 3 are 70 mm (L)×50 mm (W)×1 mm (t), the inner dimensions of a gasket assembly 5a are 74 mm (L)×54 mm (W)×2.2 mm (t), and the dimensions of a separator 1e are 72 mm (L)×52 mm (W)×0.2 mm (t). Cut portions having a rectangular cross section are formed on the side surfaces of the two end portions of the separator 1. Frame-like rubber packings 15 having a rectangular cross section are arranged on these cut portions. This packing has outer dimensions of 71 mm (L)×51 mm (W), inner dimensions of 69 mm (L)×49 mm (W), and a thickness of 0.05 mm. Note that the cross-sectional shape of the packing can be a circle instead of a rectangle. Note also that the components of an electrolytic solution 6 and the material of each polarized electrode 3 were the same as in Example 1.

EXAMPLE 5

Figure 1:
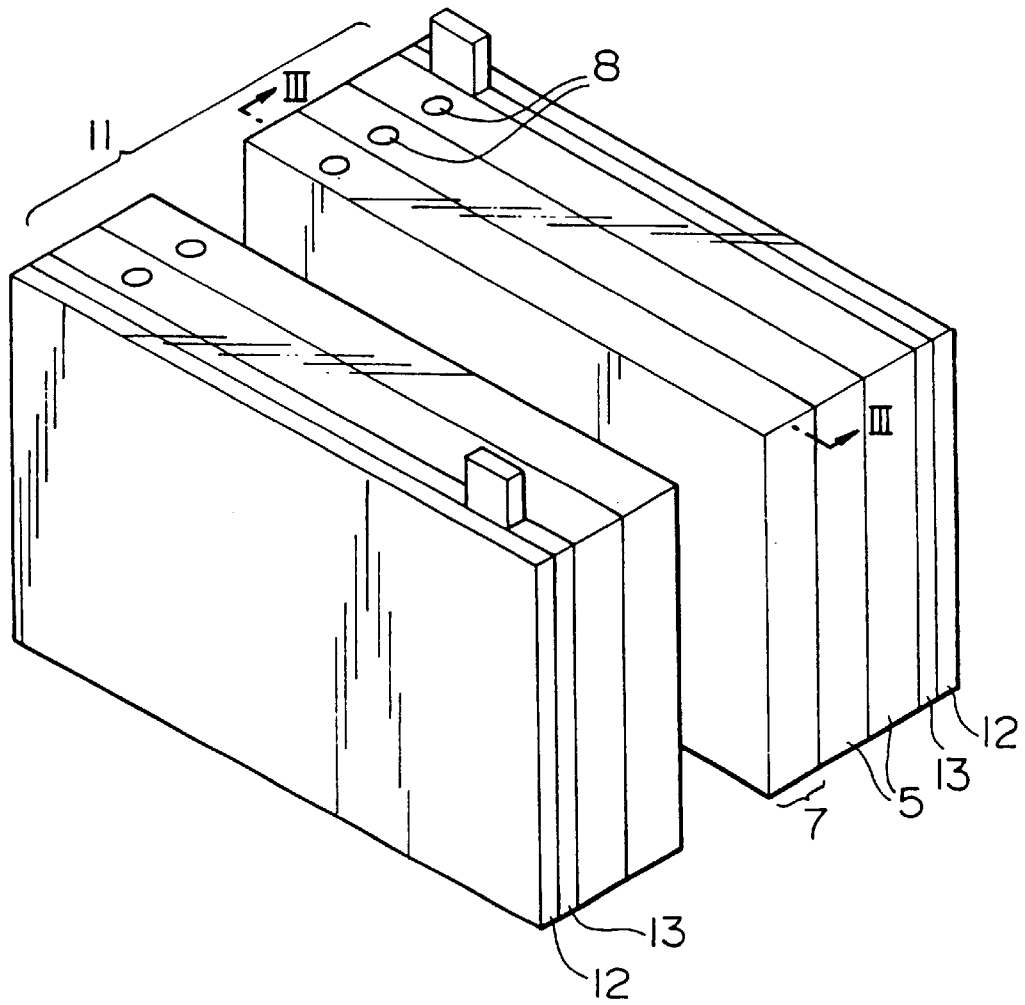
FIG. 1 is a perspective view showing the schematic structure of a conventional electric double layer capacitor.
Figure 2:
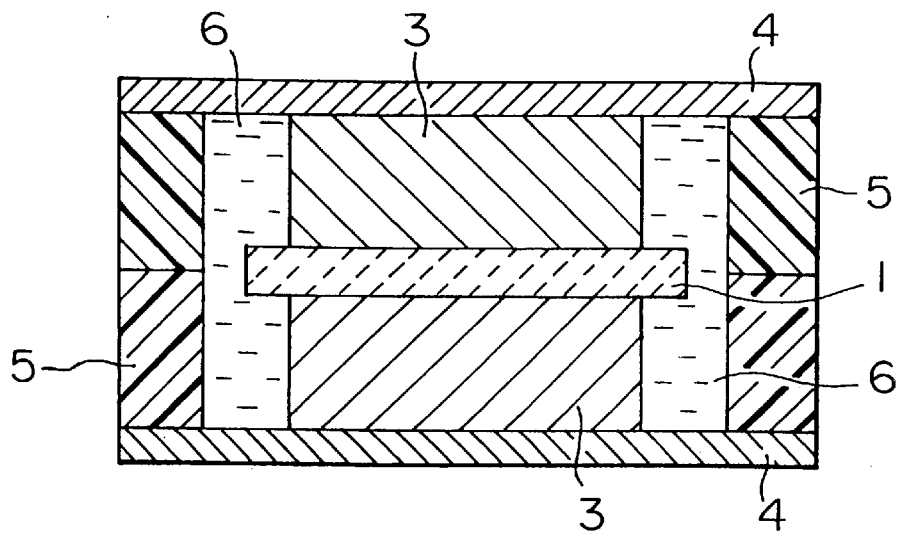
FIG. 2 is a cross-sectional view showing the structure of a basic cell in the first prior art.
Figure 3:
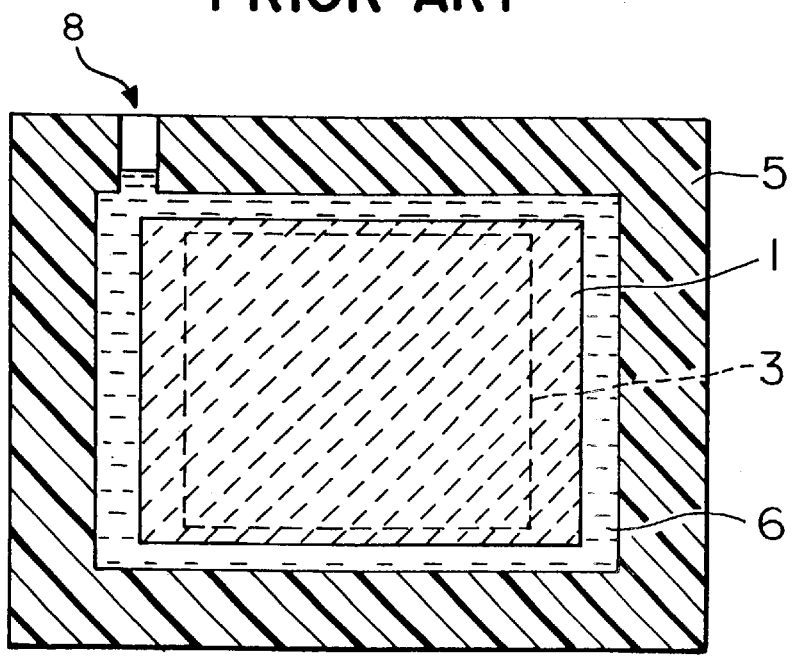
FIG. 3 is a longitudinal sectional view taken along a line III—III in FIG. 1.
Figure 11:
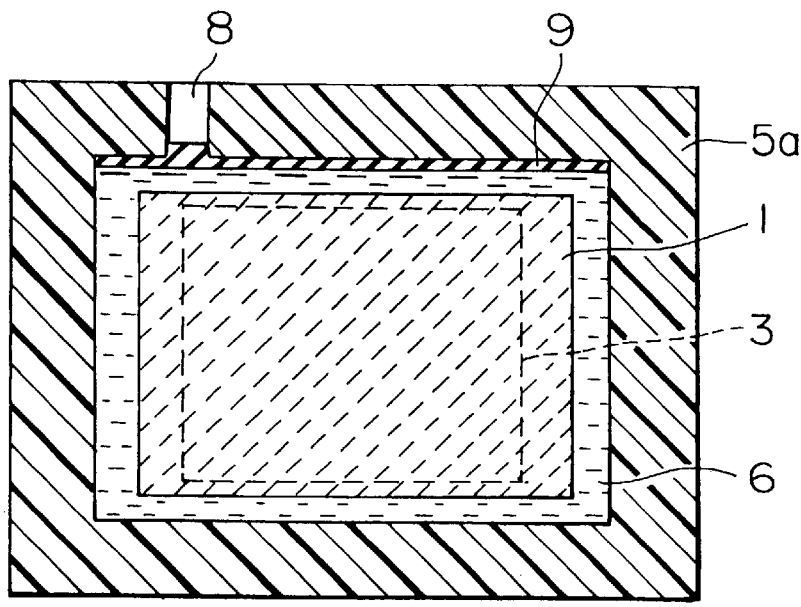
FIG. 11 is a sectional view showing a structure in Example 5 of the present invention.

FIG. 11 shows Example 5 of the present invention. FIG. 11 is a longitudinal sectional view of the same electric double layer capacitor as the one taken along the line III—III in FIG. 1.

In Example 5, as shown in FIG. 11, stearic acid ($C_{17}H_{35}COOH$) forming a thin film 9 was dropped into an electrolytic solution 6. Five samples were formed by dropping 0.01%, 0.045%, 0.050%, 0.10%, and 0.40% of stearic acid with respect to the total amount of the electrolytic solution 6. The conditions and method of the manufacture of this electric double layer capacitor are the same as in Examples 1 to 4.

The dimensions of each polarized electrode 3 are 70 mm (L)×50 mm (W)×1 mm (t), the inner dimensions of a gasket assembly 5a are 74 mm (L)×54 mm (W)×2.2 mm (t), and the dimensions of a separator 1 are 72 mm (L)×52 mm (W)×0.2 mm (t).

Eighteen such basic cells 7 were stacked in series to manufacture an electric double layer capacitor. Note that the components of the electrolytic solution 6 and the material of each polarized electrode 3 are the same as in Example 1.

EXAMPLE 6

Figure 12:
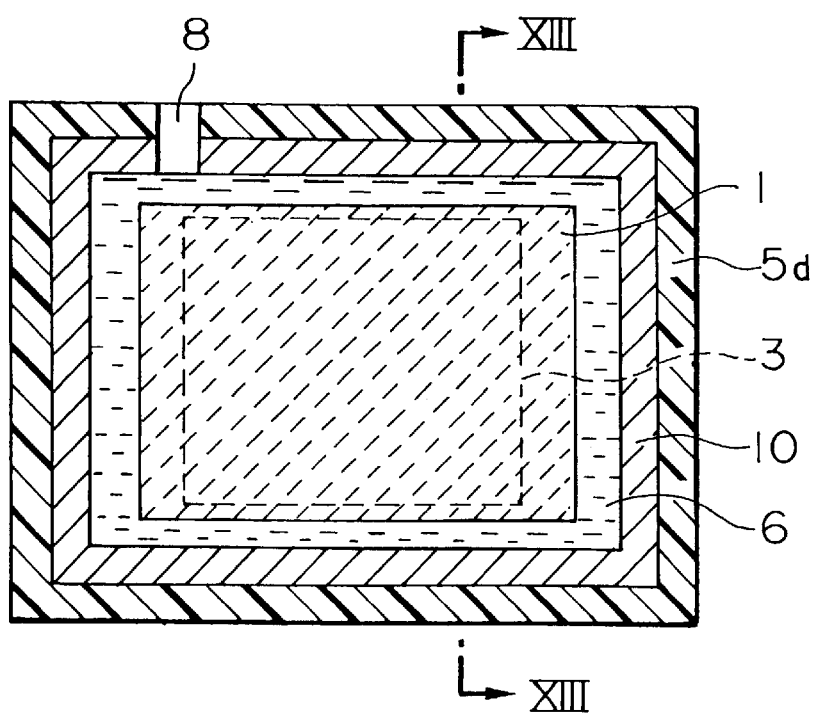
FIG. 12 is a sectional view showing a structure in Example 6 of the present invention.
Figure 13:
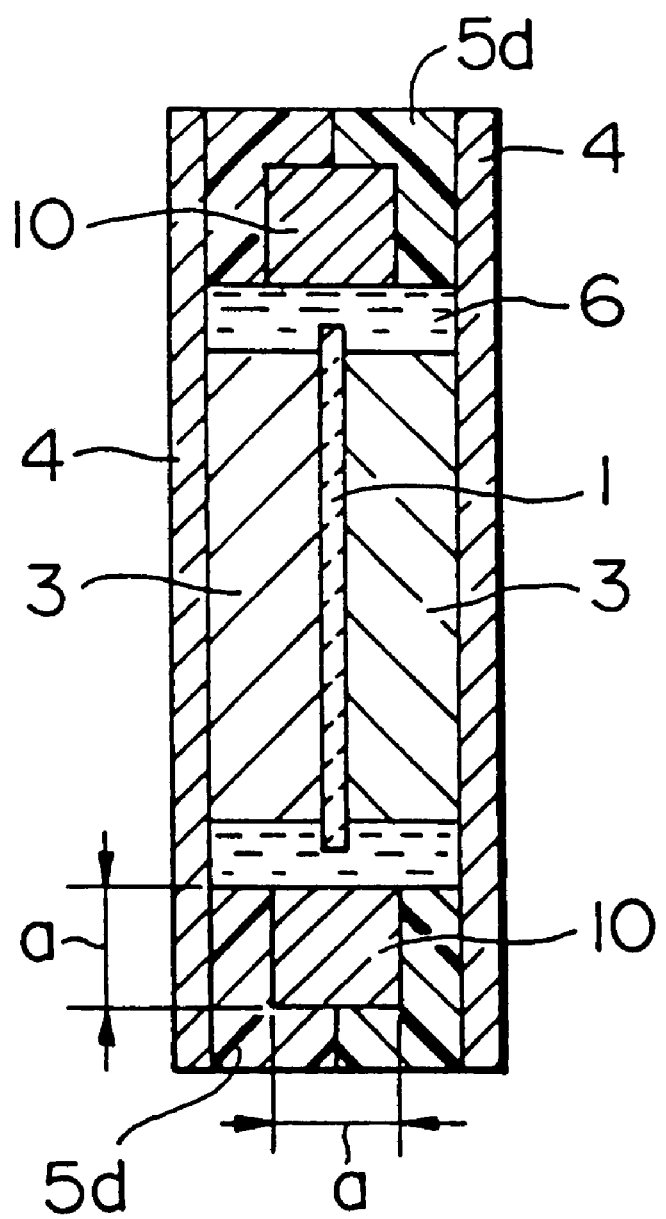
FIG. 13 is a sectional view taken along a line XIII—XIII in FIG. 12.

FIG. 12 shows Example 6 of the present invention. FIG. 12 is a longitudinal sectional view of the same electric double layer capacitor as the one taken along the line III—III in FIG. 1. FIG. 13 is a longitudinal sectional view taken along a line XIII—XIII in FIG. 12.

The conditions and method of the manufacture of this electric double layer capacitor are the same as in Examples 1 to 3 described earlier. Note also that the shapes and dimensions of each polarized electrode 3, a gasket assembly 5d, and a separator 1 are the same as in Example 5.

In Example 6, however, a recessed portion 10 (denoted by reference symbol a in FIG. 13) 1 mm in depth and 1 mm in width is formed in the direction of thickness in an inner peripheral portion of the gasket assembly 5d. This recessed portion is filled with fine crystals of silver iodide.

Comparative Example

Figure 4:
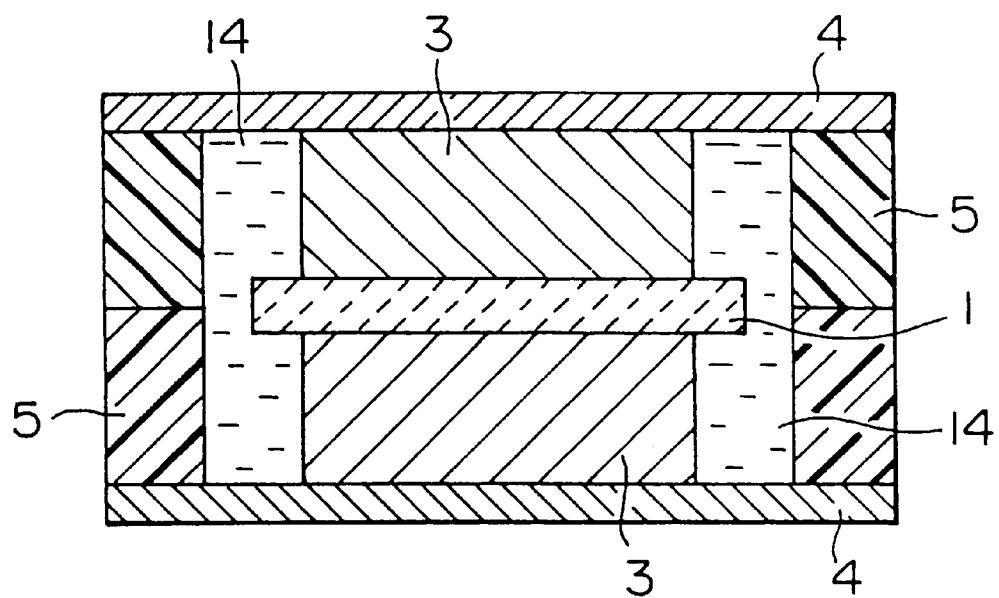
FIG. 4 is a cross-sectional view showing the structure of a basic cell in the second prior art.

The prior art shown in FIG. 4 described earlier is used as Comparative Example. The conditions and method of the manufacture of this electric double layer capacitor are the same as in Examples 1 to 6 described above.

The dimensions of each polarized electrode 3 are 70 mm (L)×50 mm (W)×1 mm (t), the inner dimensions of a gasket assembly 5 are 74 mm (L)×54 mm (W)×2.2 mm (t), and the dimensions of a separator 1 are 72 mm (L)×50 mm (W)×0.2 mm (t).

An electrolytic solution 6 made of a solution mixture in which the volume ratio of a colloidal silica solution containing 40 wt % of silica to 96 wt % of concentrated sulfuric acid was 50:7 was injected from a vent valve 8 into an air gap between the polarized electrodes 3 and the gasket assembly 5, thereby manufacturing an electric double layer capacitor as Comparative Example. Note that the material of each polarized electrode 3 was the same as in Examples 1 to 6.

The results of the reliability test performed for the electric double layer capacitors of Examples 1 to 6 of the present invention and the electric double layer capacitor of Comparative Example manufactured as described above will be described below.

In this reliability test, each electric double layer capacitor was applied with 15 V at a high temperature of 70° C. and left in this state for 1,000 h. Thereafter, the capacitance of the capacitor was measured after the capacitor was well discharged, and a ratio $\Delta C/C(\%)$ of a change amount $\Delta C$ of the capacitance to an initial value C and a ratio $\Delta E/E(\%)$ of a change amount $\Delta E$ of the ESR to an initial value E were calculated.

The ESR measurement was done by measuring the impedance at a 1-kHz test signal frequency by an AC four-terminal method and calculating the real part of the measured value. At the same time, a ratio $\Delta W/W(\%)$ of a change amount $\Delta W$ of the electrolytic solution to an initial value W was calculated.

The number of samples used in the reliability test was 30, and the average values of these samples were calculated.

TABLE

|  | NOTE | ΔC/C (%) | ΔE/E (%) | ΔW/W (%) |
| --- | --- | --- | --- | --- |
| EXAMPLE 1 |  | −18.5 | 11.9 | −17.3 |
| MODIFICATION 1 |  | −21.3 | 15.4 | −14.9 |
| MODIFICATION 2 |  | −16.5 | 12.3 | −11.5 |
| EXAMPLE 2 |  | −3.8 | 9.9 | −8.6 |
| MODIFICATION |  | −3.5 | 8.5 | −7.9 |
| EXAMPLE 3 | 1.00 mm | −13.2 | 10.1 | −9.3 |
|  | 0.50 mm | −12.9 | 10.2 | −8.9 |
|  | 0.45 mm | −46.3 | 53.1 | −43.2 |
|  | 0.40 mm | −59.3 | 68.3 | −51.3 |
|  | 0.20 mm | −62.1 | 76.5 | −54.9 |
|  | 0 mm | −83.3 | 101.3 | −63.4 |
| EXAMPLE 4 |  | −2.9 | 9.9 | −8.7 |
| EXAMPLE 5 | 0.010% | −65.4 | 89.9 | −70.1 |
|  | 0.045% | −34.5 | 49.9 | −43.5 |
|  | 0.050% | −2.3 | 3.4 | −2.8 |
|  | 0.100% | −2.0 | 3.8 | −3.3 |
|  | 0.400% | −2.1 | 3.2 | −2.9 |
| EXAMPLE 6 |  | −1.9 | 1.8 | −0.9 |
| COMPARATIVE EXAMPLE |  | −47.1 | 53.8 | −48.0 |

In Table 1, the column of NOTE indicates the width of the projecting portion of the polarized electrode 3 in Example 3 and the dropping amount with respect to the total amount of the electrolytic solution in Example 5.

Referring to Table 1, each electric double layer capacitor of the present invention shows a capacitance change ratio of −1.9 to 21.3%, although the value slightly differs from one tested sample to another. Since this value is approximately 1/20 to 1/2 the change ratio (−47.1%) of the comparative object, indicating large improvement.

Also, after the reliability test, the ESR of the comparative object increased by 53.8%, while the ESR changes in the present invention were negligibly small, indicating high stability. This is true of reductions in the electrolytic solution. However, the foregoing do not hold for a value of less than 0.5 mm in Example 3 and a value of less than 0.05% in Example 5 for the reasons explained below.

In Example 3, the individual characteristics were stable when the width of the projecting portion formed on the peripheral portion of each polarized electrode 3 was 0.5 mm or more. This is so because the cell stacked body 11 was manufactured by finally pressurizing the electric double layer capacitor. That is, if the width of the projecting portion is narrow, the projecting portion is broken by the pressure during the pressurization and does not function as a packing any longer.

In Example 5, the effect of the present invention could not be obtained when the dropping amount of stearic acid was less than 0.050% with respect to the total amount of the electrolytic solution. The reason for this is considered that since this amount does not reach an amount required to densely form a monomolecular film, air gaps are formed here and there to eventually encourage dry-up from these portions, and this increases the ΔE/E and lowers the reliability. This is also backed up by the results of the ΔW/W.

From the above results, the reasons why Comparative Example was much worse than Examples 1 to 6 are considered as follows. When the capacitor of Comparative Example was disassembled, the air gap inside the gaskets was not uniformly filled with the gel electrolytic solution, and spaces were formed here and there. It is considered that dry-up was promoted from these uncovered portions and this finally lowered the reliability.

What is claimed is:

1. An electric double layer capacitor formed by stacking at least one basic cell comprising a pair of polarized electrodes opposing each other via a separator made from a porous material soaked in a water-based electrolytic solution, collectors contacting surfaces of said polarized electrodes away from surfaces in contact with said separator, gasket assembly so arranged as to surround peripheral end faces of said polarized electrodes forming a predetermined spacing therebetween, an electrolytic solution substantially filling said spacing, and said separator having a peripheral portion projecting from the end faces of the polarized electrodes, wherein
the peripheral portion of said separator projecting from the end faces of the polarized electrodes is surrounded by a material selected from the group consisting of a thermoplastic resin, a hot-melt material and an adhesive, thereby sealing said separator so as to prevent evaporation of electrolytic solution from said separator, and a surface of each of said pair of polarized electrodes contacts opposing sides of the separator.

2. A capacitor according to claim 1, wherein said gasket assembly is frame-like including a pair of gaskets respectively corresponding to said polarized electrodes.

3. A capacitor according to claim 2, wherein each of said gaskets has an L or inverted L cross-sectional shape, and thereby said gasket assembly forms a projecting portion in a substantially central portion of an inner peripheral surface of the gasket assembly.

4. A capacitor according to claim 3, wherein the projecting portion of said gasket assembly has a recessed portion opening inward in a substantially central portion of the inner peripheral surface, and the peripheral portion of said separator is fitted in the recessed portion and adhered or heat-sealed to the recessed portion, thereby integrating said gaskets and said separator.

5. A capacitor according to claim 2, wherein silver iodide is buried in an inner peripheral portion of said gasket assembly so as to expose an inner peripheral surface.

6. A capacitor according to claim 1, wherein said electrolytic solution contains a material selected from the group consisting of higher fatty acid acid and higher alcohol in an amount of not less than 0.05% of a total amount of said electrolytic solution.

7. A capacitor according to claim 1, wherein the peripheral portion of said separator projecting from the end faces of the polarized electrodes is surrounded by a thermoplastic resin.

8. A capacitor according to claim 1, wherein the peripheral portion of said separator projecting from the end faces of the polarized electrodes is surrounded by a hot-melt material.

9. A capacitor according to claim 1, wherein the peripheral portion of said separator projecting from the end faces of the polarized electrodes is surrounded by an adhesive.

10. An electric double layer capacitor formed by stacking at least one basic cell comprising a pair of polarized electrodes opposing each other via a separator made from a porous material soaked in a water-based electrolytic solution, collectors contacting surfaces of said polarized electrodes away from surfaces in contact with said separator, gasket assembly so arranged as to surround peripheral end faces of said polarized electrodes forming a predetermined spacing therebetween, and an electrolytic solution substantially filling said spacing, wherein
a peripheral portion of said separator is surrounded by projecting portions formed on outer peripheral end portions of the surfaces of said polarized electrodes in contact with said separator.

11. A capacitor according to claim 10, wherein a width of each of said projecting portions of said polarized electrodes is not less than 0.5 mm.

12. An electric double layer capacitor formed by stacking at least one basic cell comprising a pair of polarized electrodes opposing each other via a separator made from a porous material soaked in a water-based electrolytic solution, collectors contacting surfaces of said polarized electrodes away from surfaces in contact with said separator, gasket assembly so arranged as to surround peripheral end faces of said polarized electrodes forming a predetermined spacing therebetween, and an electrolytic solution substantially filling said spacing, wherein a peripheral portion of said separator is surrounded by another material, rectangular cut portions having a predetermined width and a predetermined depth are formed in side surfaces of a peripheral end portion of said separator, and frame-like rubber packings having a rectangular or circular cross section are arranged on the cut portions.

* * * * *

UNITED STATES PATENT AND TRADEMARK OFFICE
CERTIFICATE OF CORRECTION

PATENT NO.    : 6,324,049 B1
DATED         : November 27, 2001
INVENTOR(S)   : Masako Inagawa, Keitaro Katsu and Yoshiki Inoue It is certified that error appears in the above-identified patent and that said Letters Patent is hereby corrected as shown below:

<u>Title page,</u>
Please delete "Foreign Application Priority Data December 19, 1996" insert -- Foreign Application Priority Data December 9, 1996 --.

Signed and Sealed this

Fourth Day of June, 2002

*Attest:*

*Attesting Officer*

JAMES E. ROGAN
*Director of the United States Patent and Trademark Office*